United States Patent [19]

Wittich

[11] Patent Number: 4,652,059
[45] Date of Patent: Mar. 24, 1987

[54] PARKING BRAKE VALVE FOR A HYDRAULIC EXTERNAL FORCE BRAKE SYSTEM

[75] Inventor: Kurt Wittich, Lohr, Fed. Rep. of Germany

[73] Assignee: Mannesmann Rexroth GmbH, Fed. Rep. of Germany

[21] Appl. No.: 779,585

[22] Filed: Sep. 24, 1985

[30] Foreign Application Priority Data

Oct. 2, 1984 [DE] Fed. Rep. of Germany ....... 3436130

[51] Int. Cl.⁴ .............................................. B60T 17/00
[52] U.S. Cl. ......................................... 303/89; 251/94
[58] Field of Search ................. 188/265; 251/89.5, 94, 251/101, 102, 106; 303/50, 71, 89

[56] References Cited

U.S. PATENT DOCUMENTS 3,671,087  6/1972  Pekrul ................................... 303/89

FOREIGN PATENT DOCUMENTS 219043  1/1942  Switzerland ........................... 303/89

Primary Examiner—Duane A. Reger
Attorney, Agent, or Firm—Ostrolenk, Faber, Gerb & Soffen

[57] ABSTRACT

A parking brake valve cooperates with a spring loaded cylinder which releases a parking brake when pressurized. The valve includes a shaft with an eccentric section, and this shaft may be turned by an actuating lever from a position in which the brake is engaged to a released position. In the released position, the eccentric section of the shaft causes the movement of a control piston, permitting the spring loaded cylinder to be pressurized, releasing the brake. The pressure applied to the spring loaded cylinder is also provided to a radial surface on the shaft, causing the shaft to be friction locked in the released position, despite a spring force applied by a control spring tending to return it to the braking position. If a breakdown occurs in the parking brake system, however, the pressure to the spring loaded cylinder will drop, releasing the friction lock. The control spring then returns the shaft to the braking position, automatically bringing the actuating lever into its braking position, indicating that the parking brake is applied.

10 Claims, 2 Drawing Figures

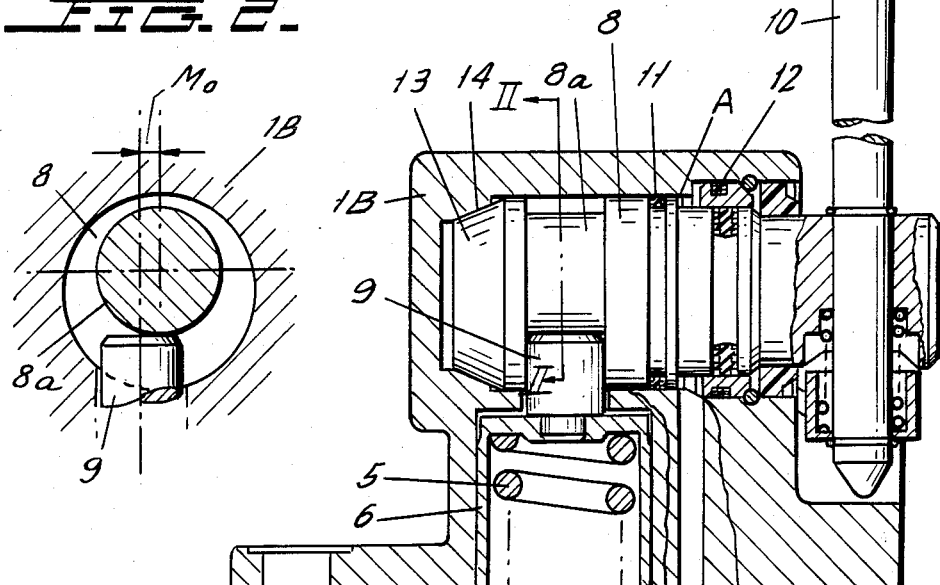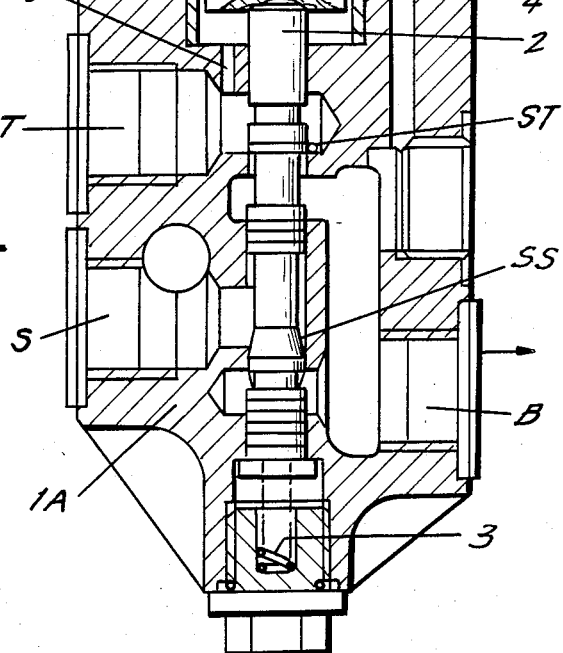

PARKING BRAKE VALVE FOR A HYDRAULIC EXTERNAL FORCE BRAKE SYSTEM

BACKGROUND OF THE INVENTION

The present invention relates to a brake valve mechanism in which the movement of an actuating lever displaces a control piston to apply pressure or to release pressure applied to a brake cylinder. More specifically, the present invention relates to a parking brake valve which applies pressure and releases pressure from a spring loaded braking cylinder.

Hydraulic external force brake systems are power brake systems in which the pressure applied to the brakes comes from a source of a pressure medium or a hydraulic fluid such as an accumulator or a pump, for example. Parking brake valves in such systems typically cooperate with spring loaded brake cylinders which provide the energy necessary for braking. The brake is released by increasing the pressure in a line leading from a brake connection on the valve to the spring loaded cylinder.

The Scandinavian countries require that parking brakes operate in the following manner: (1) When the vehicle is braked, i.e., when the line leading to the spring loaded cylinder is at a low pressure, the lever which actuates the parking brake in response to a foot or hand motion must be in a defined braking position. (2) In case of a breakdown, such as the rupture of a line in the parking brake system, the vehicle can only be operated if the parking brake valve is in its braking position, and the actuating lever must also be in its defined braking position.

One known solution which satisfies the second requirement is to prevent the starting of the vehicle by using a pressure switch together with a device for monitoring the position of the actuating lever. In particular, when a breakdown occurs, the actuating lever must be monitored to determine whether it is in the braking position.

It would be advantageous to provide a brake valve system which would meet these requirements indicated above under items (1) and (2) hydraulically rather than electrically and without preventing starting of the vehicle engine.

SUMMARY OF THE INVENTION

The present invention provides a brake valve mechanism which makes it possible to ensure that the actuating lever will be in the braking position in the event of a breakdown resulting in reduced pressure to the brake cylinder. The brake valve mechanism of the invention makes this possible hydraulically, without relying on electrical measures such as preventing engine starting.

A brake valve mechanism according to the present invention includes a transmission element which moves between a first position in which the brake is engaged and a second position in which the brake is released in response to the actuating lever. In addition, engaging means are provided for engaging with the transmission element and the control piston and for moving the control piston into its braking and released positions in accordance with the position of the transmission element and further for applying a force urging the transmission element into its braking position. Means responsive to the pressure of the fluid being provided to the brake cylinder prevent the movement of the transmission element when the cylinder is under pressure. As a result, if the pressure to the brake cylinder is low, as would occur in the event of a rupture in the brake line, the transmission element will not be prevented from moving, but will return to its braking position in response to the urging force.

The brake valve mechanism of the present invention thus simultaneously urges the transmission element into the position in which the parking brake is engaged and also hydraulically locks it in position against the urging action if the pressure to the brake cylinder is high. A breakdown in the parking brake system will result in low pressure to the spring loaded cylinder and therefore in the engagement of the parking brake. Due to the connection of the transmission element to the actuating lever, the valve of the present invention assures, however, that the breakdown will also cause the actuating lever to return to its braking position together with the transmission element, indicating that the parking brake is applied. This will occur because the low pressure to the spring loaded cylinder will also release the locking of the transmission element, which will return to the braking position in response to the urging force.

The transmission element may be a shaft, while the engaging means may include a ram which engages the shaft and a spring which is engaged between the ram and one end of the control piston. The shaft may include an eccentric section engaged by the ram and shaped to rotate the shaft into the braking position in response to the urging force applied by the ram. The ram and the control piston may be movable along a common axis, perpendicular to the axis of the shaft. The control piston may be biased into its braking position by a spring at the end opposite the shaft.

The shaft may be held in a housing which is connected to the housing around the control piston, with a channel extending through the housings from the opening which leads to the brake cylinder to the cavity around the shaft. The shaft itself may have a radial surface against which the pressure in this channel is exerted, causing a conical end section of the shaft to be pressed against a conical inner wall section of the housing, thereby preventing the shaft from turning under the influence of the force exerted by the ram when the pressure to the cylinder is high.

The control spring between the ram and the control piston insures that the control piston will move when the shaft is turned. At the same time, the frictional locking of the conical end section of the shaft against the conical inner wall of the housing as a result of axial movement of the shaft occurs in response to the fluid under pressure. The valve of the invention provides a simple way to use the fluid under pressure in the spring loaded cylinder to provide this axial displacement and, when a drop in pressure occurs, to release the shaft by disengaging the frictional locking between the conical surfaces, returning the actuating lever to the braking position. More specifically, when a breakdown causes the pressure to the cylinder to drop, the resulting turning of the shaft into its braking position will cause the control piston to be moved into its braking position. In this position, the control piston prevents the fluid under pressure from the source from entering the line to the spring loaded cylinder, so that a leak which may occur will not affect the operation of the source of fluid under pressure.

Other objects, features and advantages of the invention will be apparent from the following description together with the accompanying drawings and the appended claims.

BRIEF DESCRIPTION OF THE DRAWING

FIG. 1 is a longitudinal section through a parking brake valve according to the present invention, and FIG. 2 is a sectional view along II—II in FIG. 1 as a further embodiment of the invention.

DETAILED DESCRIPTION OF THE PREFERRED EMBODIMENTS

The parking brake valve shown in the Figures has a two-part housing. The valve housing 1A has a cavity inside it containing control piston 2, the surface of which is stepped in order to control the flow of fluid through the cavity. Opening S is provided for connecting the cavity to a source of hydraulic fluid under pressure, which may be an accumulator or a pump, for example. Opening T is provided for connecting the cavity to a reservoir of fluid which is not under pressure, such as a tank which serves as a fluid supply. Opening B is provided for connecting the cavity to a spring loaded cylinder (brake cylinder) (not shown) which, as described above, supplies the energy necessary for braking.

A spring loaded cylinder for use with the valve according to the invention may be of the type which ordinarily holds a parking brake in the braking position, the braking position of the valve being shown in the Figure. In this position, control piston 2 permits fluid to flow between opening B and opening T, but prevents fluid under pressure from entering opening B from opening S, so that the pressure in opening B will be low. If, however, control piston 2 is moved to the position in which the brake is released, corresponding to a downward movement in FIG. 1, fluid is prevented from flowing between opening B and opening T, but fluid under pressure is permitted to flow from the source through opening S to opening B, so that the pressure provided to the spring loaded cylinder increases. In response to this increased pressure, the spring loaded cylinder disengages and releases the parking brake.

Control piston 2 is biased toward the braking position shown in FIG. 1 by spring 3 which engages one end of control piston 2. In the braking position, control valve surface ST on control piston 2 is held away from its seat on housing 1A, permitting communication between the reservoir connected to opening T and the spring loaded cylinder connected to opening B. Control valve surface SS, on the other hand, engages its valve seat, preventing communication of fluid under pressure from the source connected to opening S into the spring loaded cylinder connected to opening B.

The end surface of control piston 2 which is opposite the biasing spring 3 cooperatively engages a spring seat 4 which fits into one end of control spring 5. The other end of control spring 5 fits into sleeve 6. Sleeve 6 is slidable in a bore 7 defined in housing 1B, which also contains the shaft 8 which serves as the transmission element. Valve housing 1A and transmission housing 1B are connected in such a manner that the cavity containing control piston 2 is coaxial with bore 7, and spring seat 4, spring 5, sleeve 6 and ram 9 are all movable along the same axis as control piston 2 within bore 7.

Transmission housing 1B also has a cavity defined in it which contains shaft 8, and this cavity may be offset by a measure $M_o$ from bore 7 and control piston 2 and has its own axis which is perpendicular to the common axis of the bore 7 and control piston 2 (FIG. 2). As shown in the Figures, shaft 8 has an eccentric section 8a which is positioned in the area in which the axis of bore 7 intersects shaft 8. As a result, ram 9, extending from bore toward shaft 8, engages eccentric section 8a at its end opposite sleeve 6. Shaft 8 also has an end which extends out of transmission housing 1B and is connected outside the housing to actuating lever 10. Actuating lever 10 extends through a radial bore in shaft 8, and is held by a detent arrangement, as shown.

In the position of actuating lever 10 shown in the Figures, eccentric section 8a is turned so that the means which engage between shaft 8 and control piston 2 permit control piston 2 to move into its braking position. Those engaging means include spring seat 4, control spring 5, sleeve 6 and ram 9, and the engaging means also serve to urge shaft 8 to remain in its braking position. Control spring 5 may be sufficiently tensioned between spring seat 4 and sleeve 6 so that ram 9 always applies a force urging shaft 8 into its braking position, but control piston 2 does not ordinarily apply sufficient force to overcome biasing spring 3. If actuating lever 10 is pivoted around the axis of shaft 8, however, eccentric section 8a will push ram 9 downward sufficiently to overcome biasing spring 3, moving control piston 2 downward into the brake released position.

When actuating lever 10 is pivoted as described above, bringing shaft 8 into its brake released position, and causing control piston to move into its brake released position, shaft 8 will ordinarily remain locked in this position. For this purpose, means are provided which respond to the pressure in opening B and prevent the movement of shaft 8 despite the force of control spring 5 urging it into the braking position. These means operate, however, only when the pressure at the opening B is high, so that if a breakdown occurs, such as a rupture of the hydraulic line, the resulting low pressure will permit shaft 8 and actuating lever 10 to their braking positions, and control piston 2 will, in turn, return to its braking position. For this purpose, shaft 8 has a radially extending surface A facing a portion of the transmission cavity defined in the transmission housing 1B and serving as a pressure chamber. This pressure chamber is sealed off by seals 11 and 12 between shaft 8 and the inner wall of transmission housing 1B. Shaft 8 is shaped so that the only radial surface on shaft 8 which faces the pressure chamber is radial surface A, the other radial surface being defined on seal 12, for example. As a result, if pressure builds up in the pressure chamber, shaft 8 will be displaced or urged toward the left in FIG. 1.

At the left end of shaft 8, as shown in FIG. 1, is a conically shaped end section 13 facing a corresponding conical inner wall surface 14 on the transmission housing 1B. When shaft 8 is displaced or urged toward the left in response to pressure in the pressure chamber, conical end section 13 will be pressed against conical inner wall surface 14 in a friction locking manner. This locking will prevent shaft 8 from turning despite the urging force applied to its eccentric section 8a by ram 9 in response to control spring 5. Therefore, cooperating surfaces 13 and 14 form a type of brake or coupling between shaft 8 and housing 1B.

FIG. 1 also shows channel 15 defined in housings 1A and 1B and communicating between opening B and the pressure chamber in the transmission cavity so that the pressure in opening B will also be exerted against radial surface A of shaft 8. If the normal high pressure of the fluid under pressure is present in opening B, the resulting coupling force between surfaces 13 and 14 will be sufficient to prevent the turning of shaft 8 in response to the urging force of spring 5, but will nevertheless permit surfaces 13 and 14 to be moved in relation to each other by means of actuating lever 10, which may be moved by hand or by foot, for example. Therefore, when it is desired to engage the parking brake, actuating lever 10 may be moved so that shaft 8 returns to the braking position, permitting control piston 2 to return to its braking position, engaging the parking brake.

As shown in FIG. 1, channel 15 is defined by aligned channels formed in housings 1A and 1B, around which an appropriate seal is provided at the point of connection between the housings. Similarly, a seal is provided around bore 7 at the point of connection, and channel 16 connects bore 7 and the adjoining regions of the cavities in the housing to the low pressure connection to the reservoir through opening T. As a result, no pressure will build up in bore 7 or in the adjoining regions, and excess fluid which accumulates may drain through channel 16.

The parking brake valve of the Figure operates as follows: In the position shown, actuating lever 10 is in its braking position and control piston 2 permits fluid to flow between the spring loaded cylinder connected to opening B and the reservoir connected to opening T. Therefore, no pressure is applied to the spring loaded cylinder, and its spring force causes the parking brake to engage. To release the brake, actuating lever 10 is first pivoted into its released position, turning shaft 8 together with its eccentric section 8a from the braking position to its released position. This causes ram 9 to move downward in cooperation with sleeve 6, compressing control spring 5. Due to its compression, control spring 5 exerts an increased force through spring seat 4 on control piston 2, moving control piston 2 against the force of biasing spring 3. As a result, control piston 2 moves from its braking position into its released position, permitting fluid under pressure to flow from the fluid source connected to opening S to the spring loaded cylinder connected to opening B. As a result, the spring loaded cylinder is pressurized and releases the parking brake. At the same time, the pressure on the spring loaded cylinder is also communicated through channel 15 into the pressure chamber, and is exerted against radial surface A on shaft 8. This pressure presses the conical end section 13 of shaft 8 in a friction locked manner against the conical inner wall surface 14 of transmission housing 1B. As a result of this friction locking, the elastic force of the control spring 5 is not able to move shaft 8 despite the moment applied by ram 9 to the eccentric section 8a. Therefore, actuating lever 10 does not return to the braking position, but remains in the released position, although it could be returned to the braking position by turning actuating lever 10 to its braking position.

If, while the parking brake is released, a breakdown such as a leak or a rupture of a line in the parking brake system occurs, resulting in a drop in pressure at opening B, the pressure in the pressure chamber also drops. As a result, the conical end section 13 of shaft 8 is no longer pressed against the conical inner wall surface 14, and the elastic force of control spring 5 is able to return shaft 8 and actuating lever 10 to the position shown in FIG. 1. In other words, control spring 5 is able to turn actuating lever 10 to its braking position, indicating to an operator the engaged condition of the parking brake.

The biasing force of spring 3 also returns control piston 2 to its braking position, interrupting the flow between the source of fluid under pressure connected to opening S and the spring loaded cylinder connected to opening B. When the breakdown is repaired, the parking brake remains engaged automatically and must again be released by pivoting actuating lever 10 into the released position in the manner described above, before further use of the vehicle.

The present invention provides a parking brake valve which cooperates with a spring loaded cylinder which releases or disengages a parking brake when pressurized. The valve of the invention has a shaft with an eccentric section, and this shaft may be turned by an actuating lever to a position in which the parking brake is released by pressurizing the spring loaded cylinder. The pressure in the spring loaded cylinder is also applied to friction lock the shaft in position so that, despite the force applied by a control spring, it cannot return to the position in which the parking brake is engaged. If, however, due to a breakdown in the parking brake system, the pressure to the spring loaded cylinder drops, the friction lock of the shaft is released, permitting the shaft to return to the braking position in response to the control spring. The shaft automatically brings the actuating lever into the braking position, indicating that the parking brake is applied.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A brake valve mechanism comprising:
   a control piston movable between a first position for providing a fluid under pressure to a cylinder which releases a brake when it receives fluid under pressure and a second position for decreasing the fluid pressure to the cylinder for applying the brake;
   a transmission element movable in response to an actuating lever between a first position and a second position;
   means for engaging with the transmission element and the control piston for moving the control piston into its first and second positions when the transmission element is moved into its first and second position, respectively, and for applying a force to urge the transmission element into its second position; and
   means responsive to the fluid under pressure for preventing the movement of the transmission element despite the urging force applied by the engaging means when the fluid under pressure is being provided to the cylinder.

2. The brake valve mechanism of claim 1, in which the transmission element is a shaft movable between its first and second positions by rotation about an axis, the shaft being connected to a brake actuating lever and, having a section which is eccentric with respect to the axis, the engaging means engaging the eccentric section for applying the urging force, the eccentric section being shaped for rotating the shaft into its second position in response to the urging force.

3. The brake valve mechanism, of claim 2 in which the engaging means comprises a ram engaging the eccentric section and a control spring between the ram and the control piston.

4. The brake valve mechanism of claim 3 in which the ram and the control piston are movable along a common axis, the axis of the shaft being perpendicular to the common axis and offset to each other.

5. The brake valve mechanism of claim 3 in which the ram and the control piston are movable along a common axis, the axis of the shaft being perpendicular to the common axis.

6. The brake valve mechanism of claim 2, further comprising a valve housing having a valve cavity defined therein for holding the control piston, with an opening defined in the valve housing for connecting the valve cavity to the cylinder and a transmission housing having a transmission cavity defined therein for holding the shaft, the transmission housing further having an inner wall section facing a section of the shaft, the shaft further having a radial surface; the movement preventing means comprising means for conducting fluid pressure from the opening in the valve housing into the transmission cavity and against the radial surface for pressing the section of the shaft axially in a friction locked manner against the inner wall section to prevent shaft movement.

7. The brake valve mechanism of claim 6, in which the transmission housing is connected to the valve housing to form a housing unit, the fluid pressure conducting means comprising a channel defined in the housing unit and connecting the opening in the valve housing to the transmission cavity.

8. The brake valve mechanism of claim 6 in which the inner wall section is conical, the section of the shaft being a conical end section facing the conical inner wall section for being pressed thereagainst in response to fluid pressure against the radial surface.

9. The brake valve mechanism of claim 1, further comprising biasing means for urging the piston toward its second position.

10. The brake valve mechanism of claim 8 in which the control piston has a first end disposed toward the transmission element and a second end opposite the first end; the biasing means comprising a spring engaging the second end of the control piston.

* * * * *